United States Patent [19]
Hiiro

[11] Patent Number: 5,977,507
[45] Date of Patent: Nov. 2, 1999

[54] CURRENT DETECTING APPARATUS FOR RESISTANCE WELDING

[75] Inventor: Shigeyuki Hiiro, Chiba-ken, Japan

[73] Assignee: Miyachi Technos Corporation, Noda, Japan

[21] Appl. No.: 09/085,054

[22] Filed: May 27, 1998

[30] Foreign Application Priority Data

May 27, 1997 [JP] Japan .................................. 9-152929

[51] Int. Cl.⁶ .................................................. B23K 11/25
[52] U.S. Cl. .......................................................... 219/109
[58] Field of Search .................................. 219/109, 110

[56] References Cited

U.S. PATENT DOCUMENTS

| | | | |
|---|---|---|---|
| 3,334,341 | 8/1967 | Green ...................................... | 219/109 |
| 4,577,086 | 3/1986 | Needham et al. ..................... | 219/109 |
| 5,591,355 | 1/1997 | Ishikawa ................................ | 219/110 |

*Primary Examiner*—Clifford C. Shaw
*Attorney, Agent, or Firm*—Wenderoth, Lind & Ponack, L.L.P.

[57] ABSTRACT

A current sensor 20 in the form of a coil such as a toroidal coil provides as its output a current sense signal TS representative of a differential waveform of a welding current I. In a waveform restoring unit 22, integrating circuits 30 and 32 are switchable between an enable state (first state) and a reset state (second state). In the enable state, the current sense signal TS from the current sensor 20 is integrated and issued as integration value signals AIa and AIb representative of a waveform of the welding current I, whereas in the reset state, the integration value signals AIa and AIb are reset to reference values (e.g., 0 volt). A switching circuit 34 detects timings of each cycle or each half-cycle of the welding current I on the basis of a waveform of the current sense signal TS, and alternately switches the states of the integrating circuits 30 and 32 in a complementary manner and at a predetermined timing so that while one is placed in the enable state, the other is in the reset state. An output circuit 36 accepts the integration value signals AIa and AIb from the two integrating circuits 30 and 32 at the above predetermined timing and issues the thus accepted integration value signals as a current waveform restoration signal AI.

2 Claims, 9 Drawing Sheets

FIG. 5 (A) WELDING CURRENT I
FIG. 5 (B) CURRENT SENSE SIGNAL TS
FIG. 5 (C) PULSE SIGNAL Pa
FIG. 5 (D) PULSE SIGNAL Pb
FIG. 5 (E) SWITCHING CONTROL SIGNAL Ca
FIG. 5 (F) SWITCHING CONTROL SIGNAL Cb
FIG. 5 (G) INTAGRATION VALUE SIGNAL AIa
FIG. 5 (H) INTAGRATION VALUE SIGNAL AIb
FIG. 5 (I) CURRENT WAVEFORM RESTRATION SIGNAL AI
FIG. 5 (J) TIMER SIGNAL
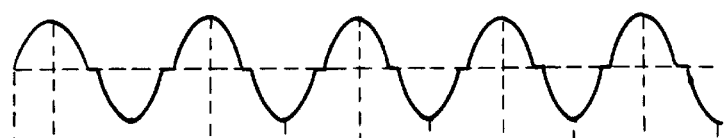
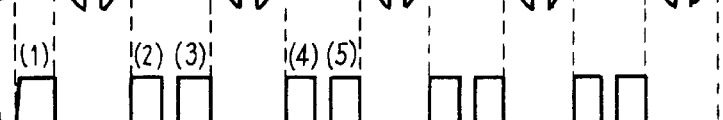
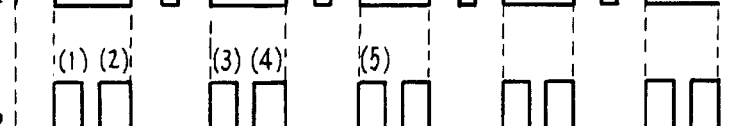
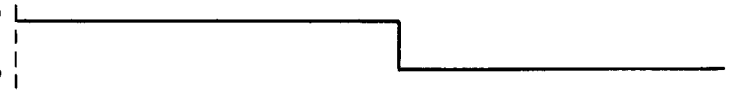
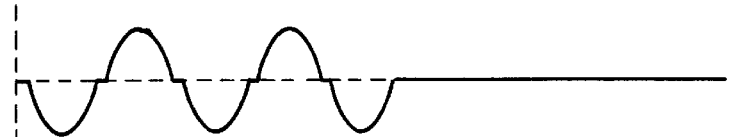
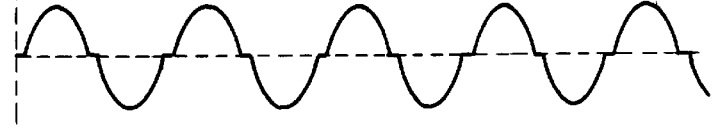
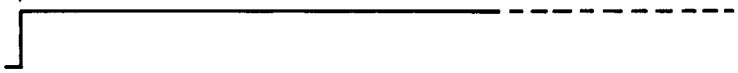

FIG.9(A) CURRENT
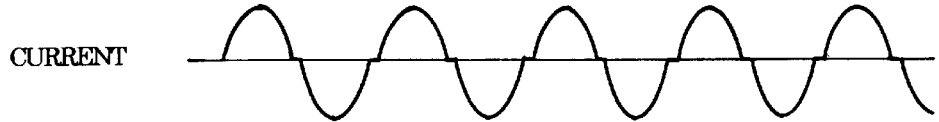
FIG.9(B) OUTPUT SIGNAL FROM WAVEFORM RESTORING UNIT
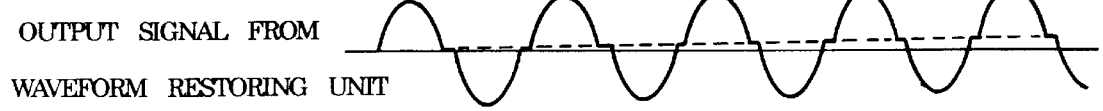
FIG.9(C) OUTPUT SIGNAL FROM WAVEFORM RESTORING UNIT
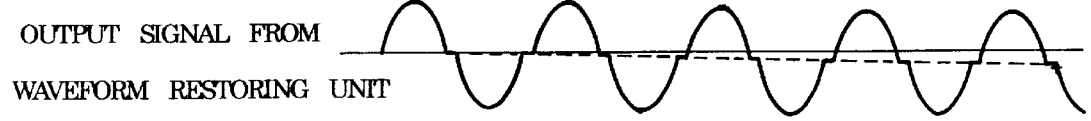

ure corresponding to a time differential of the magnetic
flux (accordingly, a time differential of the current).

CURRENT DETECTING APPARATUS FOR RESISTANCE WELDING

BACKGROUND OF THE INVENTION

1. Field of the Invention

The present invention relates to a current detecting apparatus for detecting a current flowing in a resistance welding machine.

2. Description of the Related Art

In resistance welding, a welding current is a most significant welding condition and must properly be controlled and monitored. Up until now, a resistance welding control unit or a monitoring unit has often employed a toroidal coil to detect a current flowing in a resistance welding machine. In general, the toroidal coil is mounted in such a manner as to surround a conductor through which a current flows in the resistance welding machine. When the current flows, a magnetic flux generated around the conductor passes through a toroidal coil conductor to produce an induced voltage corresponding to a time differential of the magnetic flux (accordingly, a time differential of the current).

In this manner, a signal issued from the toroidal coil represents a differential waveform of a current flowing through the resistance welding machine and hence it is not adapted to current measurements (mean value calculation or effective value calculation) unless it is modified. Thus, a waveform restoring unit comprising an integrating circuit is provided to integrate the output signal from the toroidal coil to thereby produce an integral value signal (current waveform restoration signal). In general, such an integrating circuit includes an operational amplifier.

As described above, when a current flows in the resistance welding machine during the welding operation, the toroidal coil outputs a signal indicative of a differential waveform of the current, and an integral value signal indicative of a current waveform is derived from the waveform restoring circuit on the basis of the differential waveform signal. Accordingly, in cases where a current flows in a waveform as shown in FIG. 9(A), the waveform restoring unit provides as its output a signal having a waveform similar to this current waveform.

However, actually the waveform restoring unit suffers from a disadvantage that, due to the zero-point fluctuations or the like of the operational amplifier constituting the integrating circuit, the center level (zero-point level) of the output signals, namely, of the integration value signals may deviate from the reference value (usually, 0 volt) with the elapse of time as shown in FIGS. 9(B) and 9(C).

This problem conspicuously arises in seam welding in particular. The seam welding is a process in which a joint or a seam of a relatively thin metal plate is continuously or intermittently formed by welding in a threading manner, and which requires an incomparably long current supply time (e.g., several tens of seconds) for a single welding operation as compared with that of the spot welding. For this reason, even though the zero-point level of the integration value signals remains stably in the vicinity of the reference value immediately after the start of supply of welding current, an error may gradually occur according as the current supply time elapses, resulting in a lowered accuracy of the current detection values.

However, the conventional resistance welding monitoring unit makes a monitor judgment on the basis of such less reliable current detection values, so that the accuracy or the reliability of the monitor judgment was low. In the case of performing a feedback constant current control, it was also difficult for the conventional resistance welding control unit to correctly conform the current value to a set value since the errors of the current detection values reflect on the control values.

SUMMARY OF THE INVENTION

The present invention was conceived in view of the above problems. It is therefore the object of the present invention to provide a current detecting apparatus for resistance welding ensuring constantly and stably accurate restoration of a waveform of a current flowing in a resistance welding machine to thereby improve the reliability of the current detection values.

In order to achieve the above object, according to a first aspect of the present invention there is provided a current detecting apparatus for resistance welding comprising a current sensor for sensing a primary or secondary current flowing in a resistance welding machine to output a current sense signal representing a differential waveform of the current; first and second integrating means which are switchable between a first state and a second state and which in the first state integrate the current sense signals from the current sensor to output an integration value signal representative of a waveform of the current and which in the second state reset the integration value signal to a reference value; and switching means for alternately switching the states of the first and second integrating means at predetermined time intervals so that while one is placed in the first state the other is in the second state.

Furthermore, according to a second aspect of the present invention there is provided a current detecting apparatus for resistance welding of the first aspect wherein the switching means includes timing detection means for detecting a cycle of the current on the basis of a waveform of the current sense signal from the current sensor; counter means for counting pulse signals derived from the timing detection means in conformity with the current cycle; and switching control means for separately inverting the states of the first and second integrating means at the point of time when a count value derived from the counter means has reached a predetermined value.

According to the current detecting apparatus for a resistance welding machine of the present invention, a plurality of integrating means are provided for integrating current sense signals representative of differential waveforms of a current flowing through the resistance welding machine to restore a current waveform, and the states of the plurality of integrating means are alternately switched so that while the first integrating means perform an integrating action, the second integrating means are placed in the reset state, whereby the errors of the integration value signals attributable to the zero-point fluctuations or the like can be reduced to a minimum, making it possible to stably acquire the current detection values having a high accuracy. The reliability of the resistance welding control or of the monitoring can thus be improved.

BRIEF DESCRIPTION OF THE DRAWINGS

FIGS. 5(A) to 5(J) are waveform diagrams illustrating waveforms of parts included in the welder of the embodiment;

FIGS. 9(A) to 9(C) are waveform diagrams illustrating the state of zero-point fluctuations in the waveform restoring unit.

DESCRIPTION OF THE PREFERRED EMBODIMENTS

Embodiments of the present invention will now be described with reference to FIGS. 1 to 8.

Figure 1:
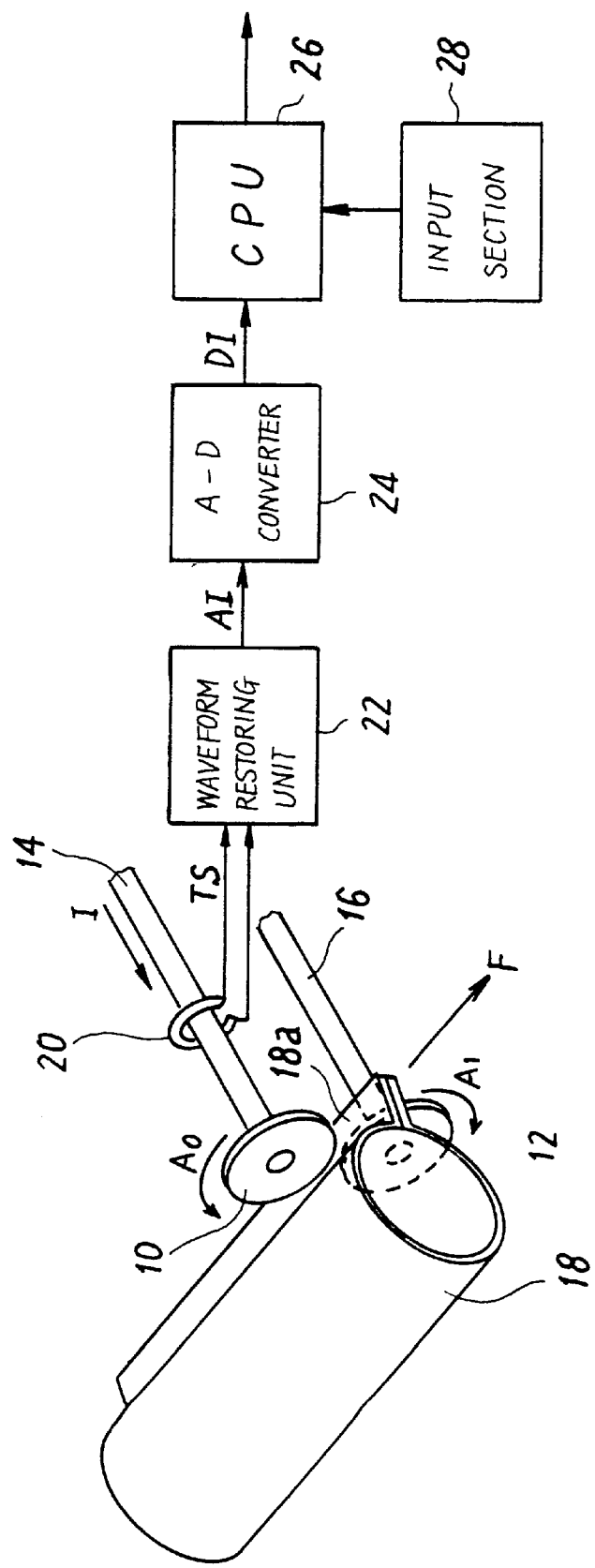
FIG. 1 is a drawing illustrating a principal configuration of an AC continuous seam welding machine to which is applied a current detecting apparatus in accordance with a first embodiment of the present invention.

FIG. 1 illustrates a principal configuration of an AC seam welding machine to which is applied a current detecting apparatus in accordance with a first embodiment of the present invention. FIG. 5 depicts waveforms of signals from parts in this embodiment.

In the seam welding machine, a pair of disk- or roller-shaped welding electrodes 10 and 12 are supported by electrically conductive arms 14 and 16, respectively, and are rotated by rotational driving means (not shown) in directions indicated by arrows $A_0$ and $A_1$, respectively. During the seam welding, the welding electrodes 10 and 12 are subjected to pressing forces applied by a pressurizing mechanism (not shown) in the direction causing the two electrodes to be pressed against each other, and are supplied via the arms 14 and 16 with secondary alternating currents (welding currents) I whose phases are controlled by a welding power supply circuit (not shown).

In the shown example, a member 18 to be welded is a metal plate for forming a cylindrical body having edges for instance, with welded portions in the form of ridge-like mating surfaces or seams 18a which confront each other when rolled. Upon the seam welding, the member 18 to be welded is conveyed by a conveyor mechanism (not shown) in a direction indicated by an arrow F so that the welded portions 18a pass between the pair of welding electrodes 10 and 12. At that time, the welding current I (FIG. 5(A)) is supplied to the welded portions 18a by way of the arms 14, 16 and the welding electrodes 10, 12, with the result that the welded portions 18a are resistance welded with a Joule heat.

The current detecting apparatus in this embodiment comprises a differential sensing-type current sensor, e.g., a toroidal coil 20 attached to a secondary conductor of the seam welding machine, e. g., the arm 14, and a waveform restoring unit 22 for restoring a waveform of the welding current I on the basis of an output signal TS (FIG. 5(B)) from the toroidal coil 20. An analog current waveform restoration signal AI (FIG. 5(I)) output from the waveform restoring unit 22 is converted by an analog-to-digital converter 24 into a digital signal DI, which in turn is fed to a CPU (a microprocessor) 26.

The CPU 26 performs various calculation processes for a resistance welding monitoring function or a control function in compliance with a predetermined program. More specifically, in the case of the resistance welding monitoring unit, the CPU 26 calculates an effective value of the welding current I every single cycle or half cycle on the basis of a waveform restoration signal DI, figures out a mean value of current effective values over a certain period of time, compares each current effective value or the mean value with a predetermined monitoring value to judge whether it is acceptable or not, and provides a display of a current measurement value and the result of the judgment by means of a display (not shown).

In the case of the resistance welding control unit, the CPU 26 calculates a current effective value every single cycle or half cycle on the basis of the waveform restoration signal DI and figures out a mean value of current effective values over a certain period of time to provide a display as a current measurement value. Alternatively, in order to provide a feedback constant current control, the CPU 26 compares the current effective value for each cycle or half cycle with a set value to obtain an error and determines a thyristor firing angle for the next cycle so that the comparison error approximates zero.

An input section 28 may be in the form of a pointing device such as a keyboard or a mouse for instance, through which are entered data such as monitoring values and set values or commands.

Figure 2:
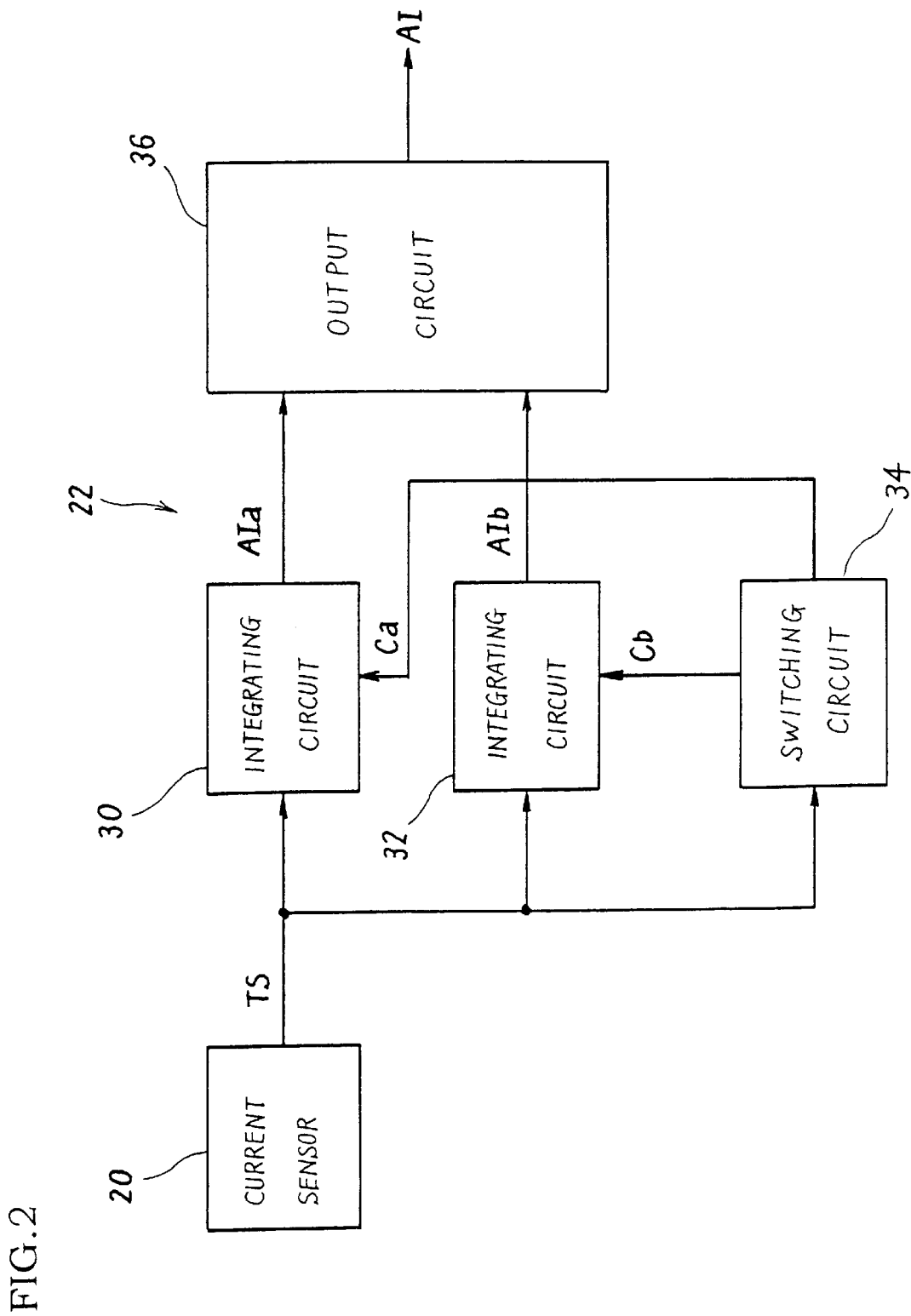
FIG. 2 is a block diagram illustrating an example of a circuit configuration of a waveform restoring circuit in accordance with the embodiment.

FIG. 2 illustrates a configuration of the waveform restoring unit 22 in this embodiment. The waveform restoring unit 22 comprises a plurality of, e.g., a couple of integrating circuits 30 and 32 having the same configuration and function, a switching circuit 34 and an output circuit 36. The current sensor (toroidal coil) 20 generates an output signal (current sense signal) TS representative of a differential waveform of the welding current I. The current sense signal TS is fed to the couple of integrating circuits 30 and 32 and the switching circuit 34 of the waveform restoring unit 22.

The integrating circuits 30 and 32 are switchable between an enable state (first state) and a reset state (second state) under the control of switching control signals Ca and Cb (FIGS. 5(E) and 5(F)), respectively, from the switching circuit 34. In the enable state, the current sense signal TS from the current sensor 20 is integrated to output integral value signals AIa and AIb (FIGS. 5(G) and 5(H)) representative of a waveform of the welding current I, whereas in the reset state the integral value signals AIa and AIb are reset to a reference value (e.g., 0 volt).

The switching circuit 34 detects timings of each one cycle or each half cycle of the welding current I on the basis of a waveform of the current sense signal TS and generates the switching control signals Ca and Cb for alternately switching the states of the couple of integrating circuits 30 and 32 in a complementary manner and at predetermined timings so as to allow one of them to be in the enable state but the other in the reset state.

The output circuit 36 receives alternately the integral value signals AIa and AIb from the couple of integrating circuits 30 and 32 at the predetermined timings and issues the thus received integral value signals as a current waveform restoration signal AI.

In the waveform restoring unit 22 in accordance with this embodiment in this manner, the couple of integrating circuits 30 and 32 have a complementary relationship in which one of them outputs an integral value signal while simultaneously the other resets the integral value signal to a reference value (e.g., 0 volt), the relationship being alternately (inversely) repeated at predetermined timings on the basis of the switching control signals Ca and Cb from the switching circuit 34. It is thus possible for the couple of the integrating circuits 30 and 32 during the seam welding to stably supply the integral value signals AIa and AIb having less zero-point fluctuations to the output circuit 36 in a successive manner while periodically correcting the errors such as the zero-point fluctuations through their respective cyclic reset to the reference value. Consequently, from the output circuit 36 there can be obtained a high accuracy current waveform restoration signal AI representative precisely of a waveform of the welding current I.

Figure 3:
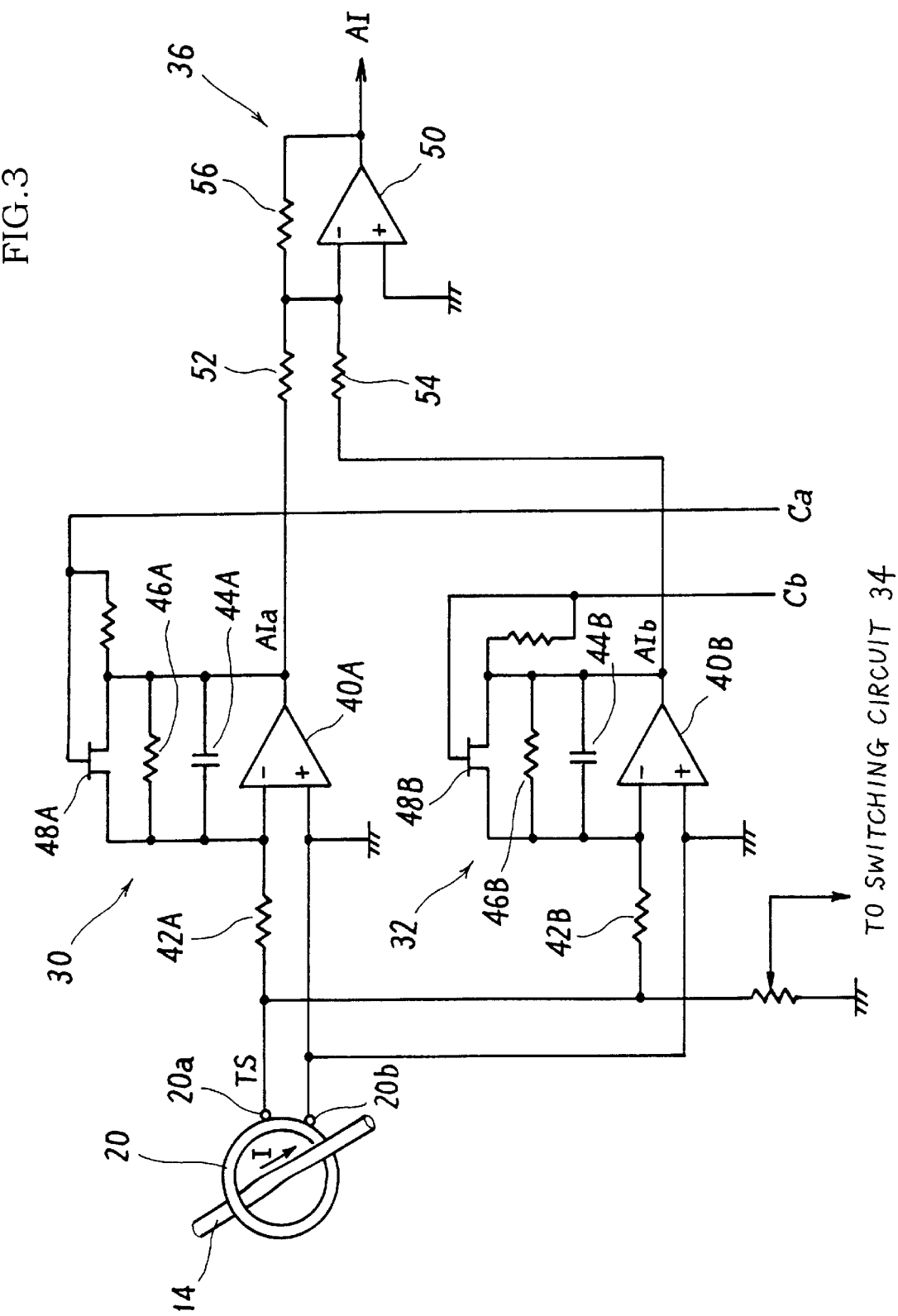
FIG. 3 is a circuit diagram illustrating an example of a circuit configuration of integrating circuits and an output circuit included in the waveform restoring circuit of the embodiment.

FIG. 3 illustrates an example of a circuit configuration of the integrating circuits 30 and 32 and the output circuit 36 included in the waveform restoration unit 22.

The integrating circuits 30 and 32 comprise respectively operational amplifiers 40A and 40B, input resistors 42A and 42B, feedback capacitors 44A and 44B, and feedback resistors 46A and 46B. Inversion input terminals of the operational amplifiers 40A and 40B are connected via the input resistors 42A and 42B, respectively, to an output terminal 20a on one hand of the current sensor (toroidal coil) 20, whereas non-inversion input terminals thereof are connected directly to a reference potential (e.g., ground potential) and to an output terminal 20b on the other of the current sensor 20.

In these integrating circuits 30 and 32, switches for resetting the integral value signals, e.g., MOS switches 48A and 48B are interposed between the output terminals and the inversion input terminals of the operational amplifiers 40A and 40B. Switching control signals Ca and Cb from the switching circuit 34 are fed via a switch driving circuit (not shown) to gate terminals of the MOS switches 48A and 48B, respectively.

Accordingly, the integrating circuit 30 is in the enable state as long as the MOS switch 48A is turned off as a result of receipt of a switching control signal Ca having L level, and integrates an input signal (current sense signal TS) to output an integral value signal AIa representative of the integral value (current waveform). Then, when the MOS switch 48A is turned on through receipt of a switching control signal Ca having H level, the integrating circuit 30 results in the reset state, discharging the feedback capacitor 44A to allow the integral value signal AIa to be reset to the reference value (0 volt).

The integral circuit 32 is in the enable state as long as the MOS switch 48B is turned off as a result of receipt of a switching control signal Cb having L level, and integrates an input signal (current sense signal TS) to output an integral value signal AIb representative of the integral value (current waveform). Then, when the MOS switch 48B is turned on through receipt of a switching control signal Cb having H level, the integrating circuit 32 results in the reset state, discharging the feedback capacitor 44B to allow the integral value signal AIb to be reset to the reference value (0 volt).

It is to be noted that integral value signals AIa and AIb having inverted polarities are derived from the output terminals of the integrating circuits 30 and 32, respectively. However, the polarities are again inverted at the output circuit 36 which follows, so that the polarity of the current waveform restoration signal AI issued from the waveform restoring unit 22 is allowed to conform to the polarity of the welding current I.

The output circuit 36 comprises an adder including an operational amplifier 50, input resistors 52, 54 and a feedback resistor 56. More specifically, inversion input terminal of the operational amplifier 50 is connected via the input resistors 52 and 54 to the output terminals of the integrating circuits 30 and 32, with non-inversion input terminal being connected directly to the ground potential. Then, the feedback resistor 56 intervenes between the output terminal and the inversion input terminal of the operational amplifier 50.

Although the output circuit 36 is constituted of the adder in this manner, it receives alternately (alternatively) input signals, namely, integral value signals AIa and AIb from the integrating circuits 30 and 32, so that at the output terminal of the output circuit 36 there appears a current waveform restoration signal AI in the form of a signal as obtained by inverting the polarity of the integral value signal (AIa or AIb) which is currently being input.

Figure 4:
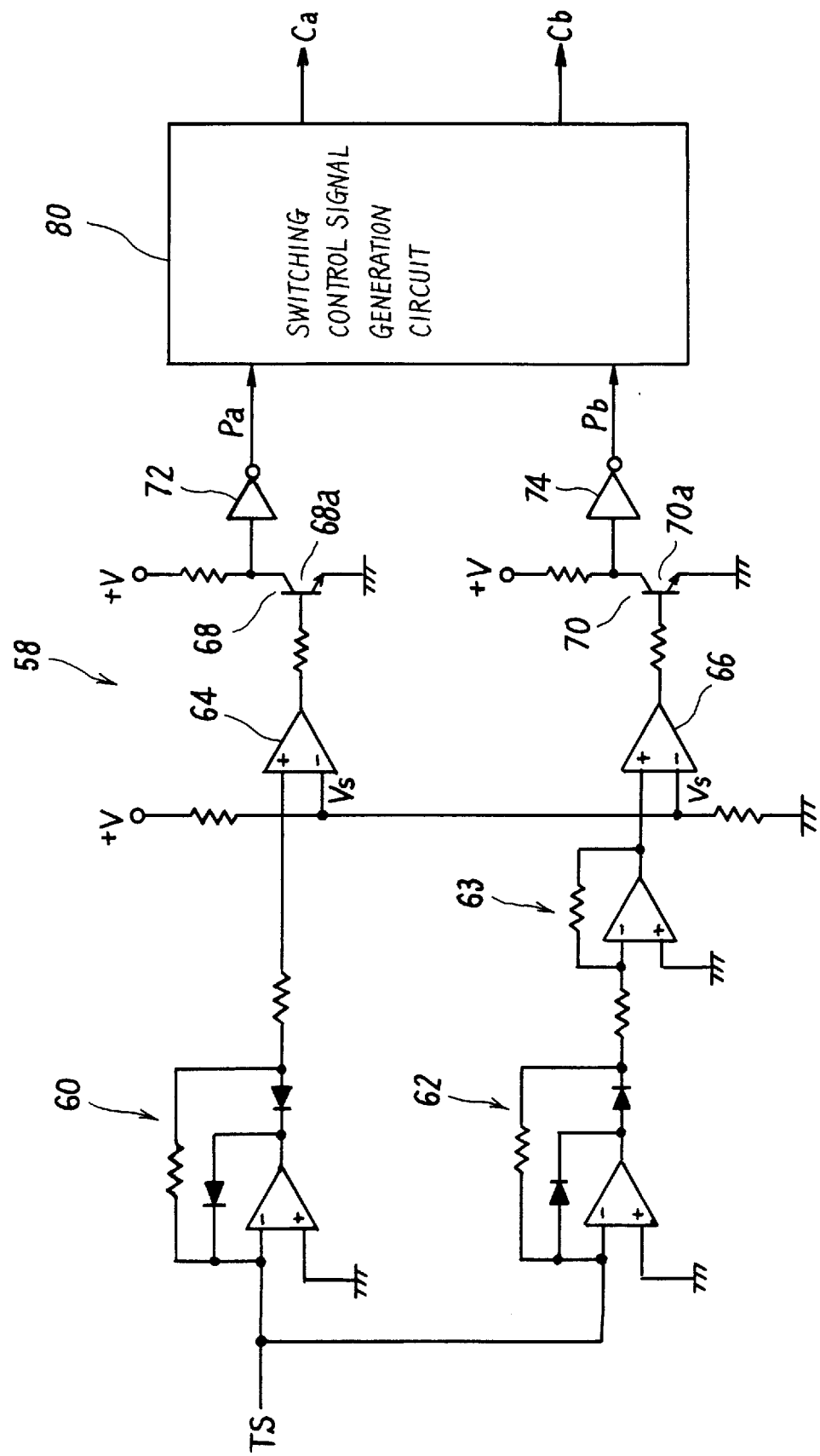
FIG. 4 is a circuit diagram illustrating an example of a circuit configuration of a switching circuit included in the waveform restoring circuit of the embodiment.

FIG. 4 illustrates an example of a circuit configuration of the switching circuit 34 included in the waveform restoring unit 22.

This switching circuit 34 comprises a timing detection circuit 58 and a switching control signal generation circuit 80. The timing detection circuit 58 includes as major elements half-wave rectifiers 60 and 62, comparison circuits 64 and 66, voltage conversion circuits 68 and 70, and inversion circuits 72 and 74.

The half-wave rectifiers 60 and 62 receive a current sense signal TS from the current sensor 20. The half-wave rectifier 60 on one hand provides as its output only a half-wave in the positive cycle of the signal TS, whereas the half-wave rectifier 62 on the other provides as its output only a half-wave in the negative cycle of the signal TS.

A positive half-wave signal output from the half-wave rectifier 60 is fed to the comparison circuit 64 in which it is compared with a reference signal Vs for waveform shaping into a rectangular wave signal, that is, a binary signal. The output signal from the comparison circuit 64 is voltage converted into a binary signal having TTL level in the voltage conversion circuit 68 comprised of a transistor 68a. It is to be noted that since the logic level is inverted in the voltage conversion circuit 68, it is returned to its original logic level in the inversion circuit 72. Thus, at the output terminal of the inversion circuit 72 there occurs a first binary signal or a pulse signal Pa having H level during the time the current sense signal TS has a positive polarity.

On the other hand, a negative half-wave signal issued from the half-wave rectifier 62 is fed to an inverting amplifier 63 in which the polarity is inverted into positive. The positive-inverted signal is then fed to the comparison circuit 66 for comparison with the reference value Vs and is wave shaped into a rectangular wave signal, namely, a binary signal. The output signal from the comparison circuit 66 is converted into a binary signal having TTL level in the voltage conversion circuit 70 comprised of a transistor 70a. Similarly, since the logic level is inverted in the voltage conversion circuit 70, it is returned to its original logic level in the inversion circuit 74. Thus, at the output terminal of the inversion circuit 74 there emerges a second binary signal or a pulse signal Pb having H level during the time the current sense signal TS has a negative polarity.

The switching control signal generation circuit 80 includes first and second counter circuits for counting the number of pulse signals Pa and Pb, respectively, a logic circuit for generating switching control signals Ca and Cb on the basis of outputs (count values) from the two counter circuits, and a counter control circuit for controlling operations of the two counter circuits.

In cases where supply of the welding current I is started from the positive polarity as shown in FIG. 5, the timing detection circuit 58 first issues a single pulse signal Pa, and then two consecutive pulse signals Pb, and then two consecutive pulse signal Pa, after which is repeated pulse train patterns in which two consecutive pulse signals Pa alternate with two consecutive pulse signals Pb at certain timings or cycles.

In response to the input of a pulse signal Pa immediately after the start of current supply in the switching control signal generation circuit 80, the logic circuit places the switching control signal Ca at L level while keeping the switching control signal Cb at H level.

Afterwards, these output states remain unchanged. Then, once the count values (the number of pulses) Na and Nb of the pulse signals Pa and Pb, respectively, derived from the two counter circuits reach a predetermined value, the logic circuit inverts the logic levels of the two switching control signals Ca and Cb. More specifically, the logic circuit allows the switching control signal Ca to rise from L level to H level while simultaneously it allows the switching control signal Cb to go from H level to L level. Immediately after this, the counter control circuit resets the two counter circuits to return the two count values [Na, Nb] to the initial values [0, 0].

In the case of the example shown in FIGS. 5(C) and 5(D), the logic circuit inverts the logic levels of the switching control signals Ca and Cb at the point of time where the count values [Na, Nb] of the two pulse signals Pa and Pb have reached [5, 5], that is, where the time equal to 2.5 cycles has elapsed.

Afterwards, the above actions of the elements are repeated within the switching control generation circuit 80 so that the two switching signals Ca and Cb are opposite in phase to each other and that their respective logic levels are inverted at a period equal to a certain period of time (2.5 cycles). It is thus possible to alternately and complementarily switch the states of the two integrating circuits 30 and 32 at a certain period (2.5 cycles) in such a manner that one of them is put in the enable state when the other is in the reset state.

Figure 6:
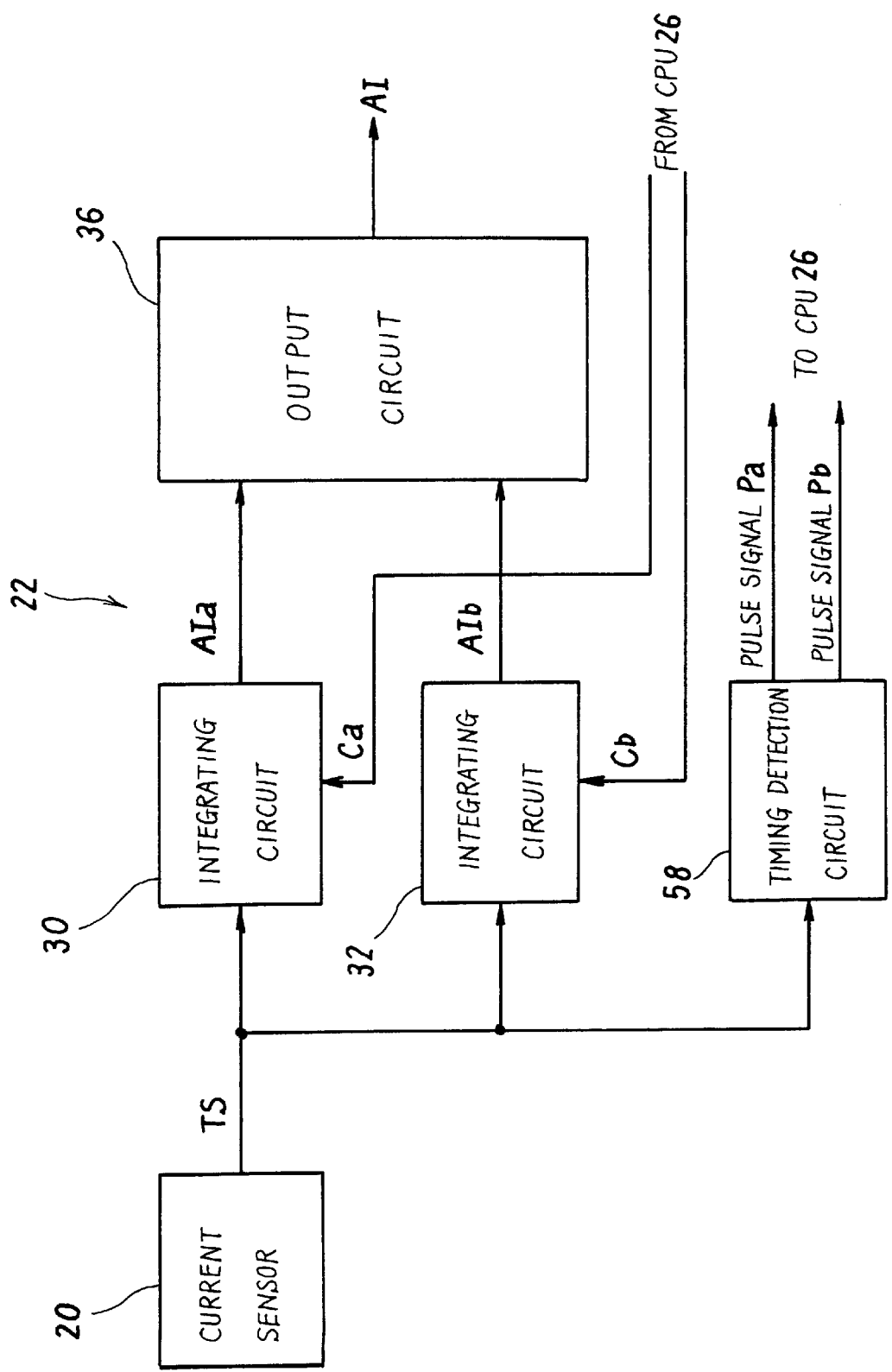
FIG. 6 is a block diagram illustrating an example of a circuit configuration of a waveform restoring circuit in accordance with a second embodiment.
Figure 7:
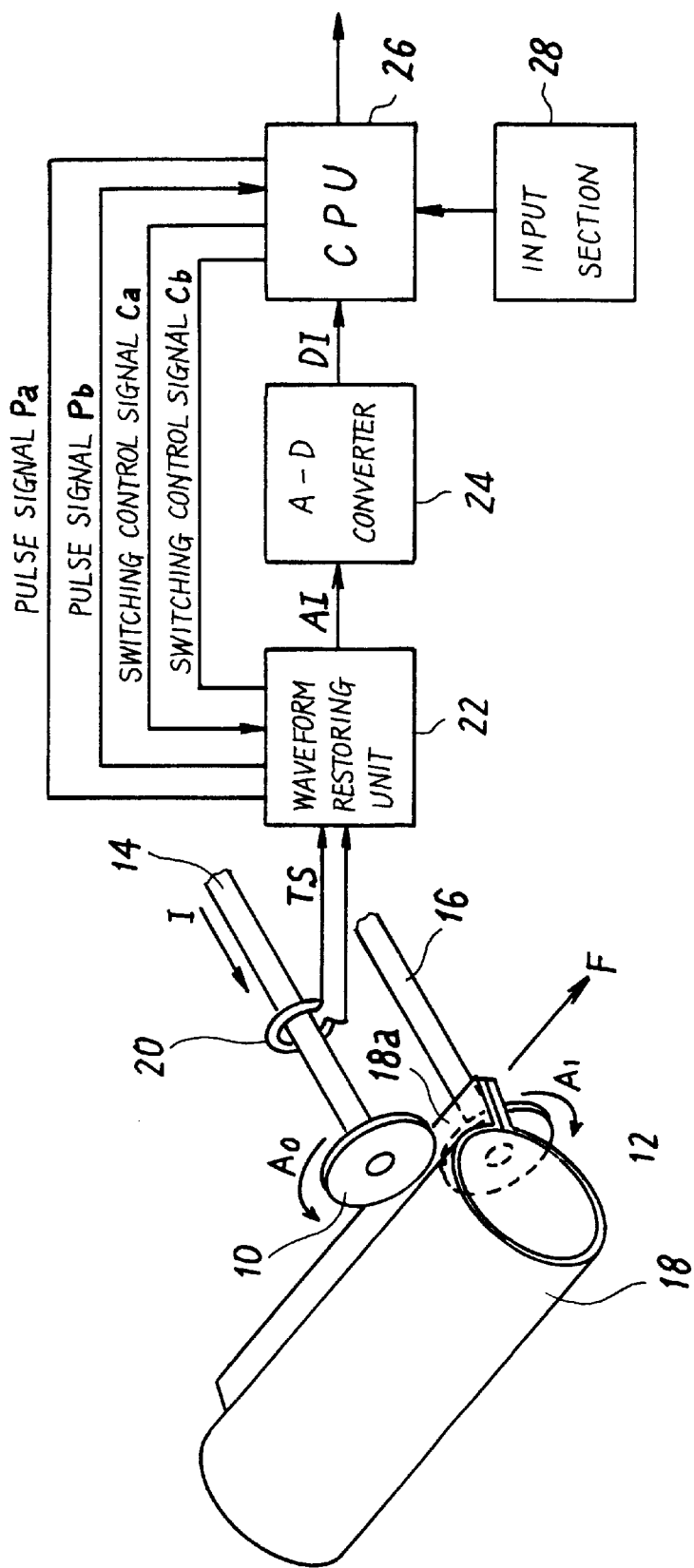
FIG. 7 is a block diagram illustrating an example of a circuit configuration of a welding current detecting apparatus in accordance with the second embodiment.
Figure 8:
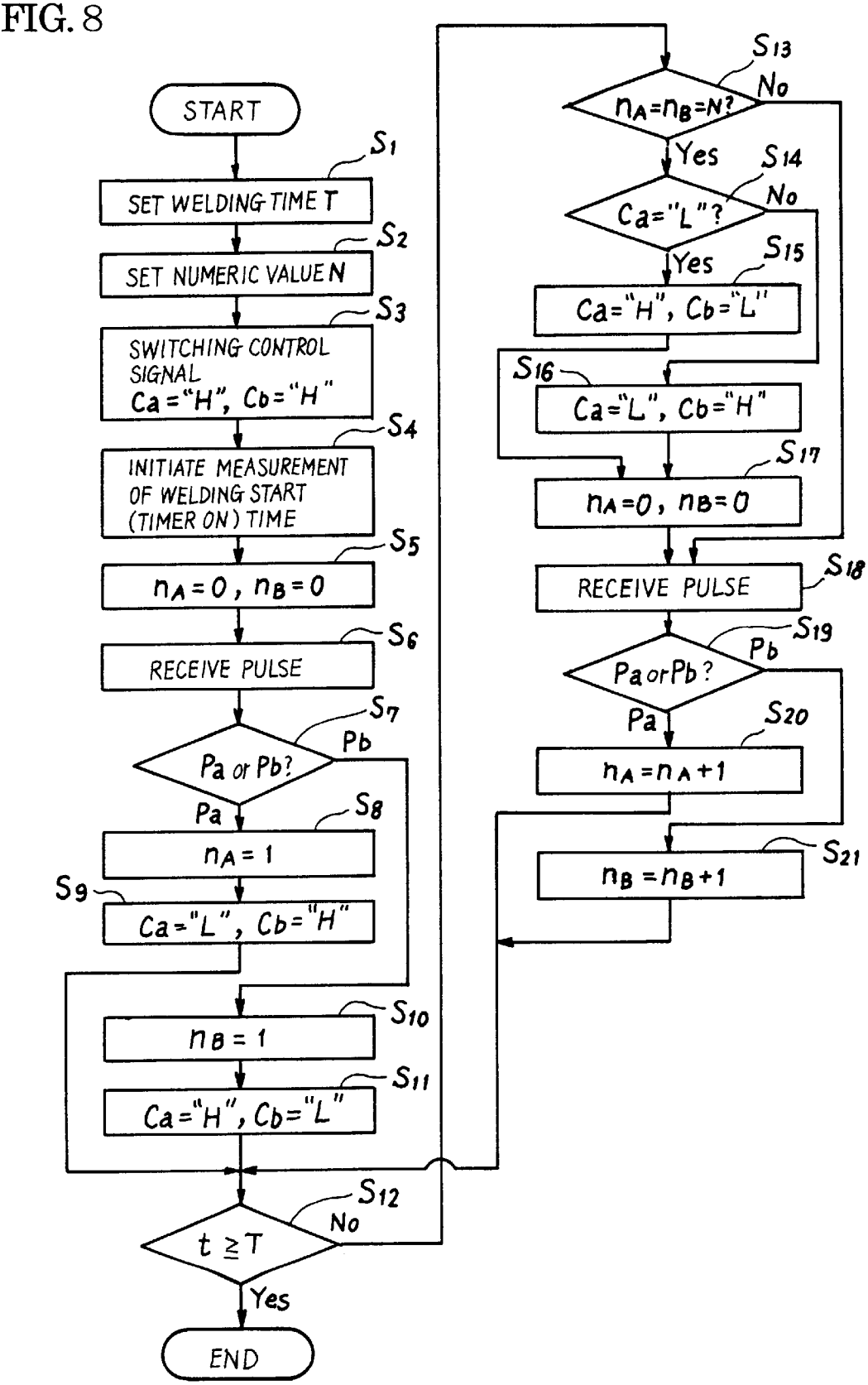
FIG. 8 is a flowchart illustrating processing operations of a CPU in the second embodiment.

Referring then to FIGS. 6 to 8, description will be made of a second embodiment in which the CPU 26 serves to perform the function of the switching control signal generation circuit 80 constituting a part of the above switching circuit 34.

In this embodiment, as illustrated in FIGS. 6 and 7, pulse signals Pa and Pb generated by the timing detection circuit 58 within the waveform restoring unit 22 are fed to the CPU 26, which generates switching control signals Ca and Cb on the basis of these pulse signals Pa and Pb. The switching control signals Ca and Cb from the CPU 26 are fed to the integrating circuits 30 and 32 included in the waveform restoring unit 22.

FIG. 8 is a flowchart illustrating the processing action of the CPU 26 for generating the switching control signals Ca and Cb in the second embodiment.

Previous to the start of supply of welding current, a weld time T is set (step $S_1$). Setting is then made of count values N of the pulse signals Pa and Pb corresponding to a timing or a period to switch the switching control signals Ca and Cb (step $S_2$). For example, N is set to 5 in cases where the switching period is a period of time (2.5 cycles) the count values of the pulse signals Pa and Pb need to reach (5, 5) together starting from (0, 0) as shown in FIGS. 5(C) and 5(D).

Then, in order to keep the two integrating circuits 30 and 32 within the waveform restoring unit 22 in the reset states prior to the start of current supply, both the switching control signals Ca and Cb are held at H level (step $S_3$).

When the supply of welding current is started, the measurement of the time t is initiated by means of a timer function (step $S_4$). Count values $n_A$ and $n_B$ of the pulse signals Pa and Pb are then set to initial values (0, 0) (step $S_5$).

Upon the receipt of a first pulse signal from the timing detection circuit 58 immediately after this (step $S_6$), it is judged whether the signal is Pa or Pb (step $S_7$). If it is the pulse signal Pa, then the count value $n_A$ of the pulse signal Pa is incremented to 1 (step $S_8$), allowing the switching control signal Ca to go to L level while keeping the switching control signal Cb at H level (step $S_9$). On the contrary, if it is the pulse signal Pb, then the count value $n_B$ of the pulse signal Pb is incremented to 1 (step $S_{10}$), allowing the switching control signal Cb to go to L level while keeping the switching control signal Ca at H level (step $S_{11}$).

This activates (sets to L level) the switching control signal (Ca or Cb) corresponding to the firstly generated pulse signal (Pa or Pb), with the result that only the integrating circuit (30 or 32) supplied with the thus activated switching control signal (Ca or Cb) is put in the enable state.

After the execution of switching of the switching control signals Ca and Cb or of the integrating circuits 30 and 32 in a manner described above, the pulse signals Pa and Pb from the timing detection circuit 58 are accepted while making sure that the measurement time t lies within the set welding time T (the duration of the supply of welding current), to increment the measurement values in sequence (steps $S_{12} \rightarrow S_{13} \rightarrow S_{18} \rightarrow S_{19} \rightarrow S_{20}$, $S_{21} \rightarrow S_{12}$).

Then, once the measurement values $n_A$ and $n_B$ of the pulse signals Pa and Pb reach the set values (5,5) (step $S_{13}$), verification is made of the logic levels of the two existing switching control signals Ca and Cb (either of them, e.g., only Ca may be verified since the two have a reverse relationship to each other) (step $S_{14}$) to simultaneously inverse the respective logic levels (steps $S_{16}$ and $S_{17}$). As a result of this, one in the enable state of the two integrating circuits 30 and 32 is switched to the reset state, whereas the other in the reset state is switched to the enable state.

Afterwards, the same actions as the above are repeated (steps $S_{12}$ to $S_{21}$). The logic levels of the two switching control signals Ca and Cb alternately invert at a period (2.5 cycles) corresponding to the set pulse count values (5,5), so that the two integrating circuits 30 and 32 are alternately switched between the enable state and the reset state so as to have opposite phases to each other.

Then, when the measurement time t reaches the set welding current supply time T (step $S_{12}$), the above processing is complete.

Although in the first and second embodiments the set count values of the pulse signals Pa and Pb have been (5, 5) and the states of the integrating circuits 30 and 32 have been inversion switched every a certain period (2.5 cycles) by way of example, it is possible to arbitrarily set the time intervals and timings of switching, and in particular the time intervals of switching may not be fixed.

It is also possible to variously select the manners of counting the pulse signals Pa and Pb for measuring the time intervals of switching in the switching control signal generation circuit 80 (CPU 26). In the case of the above example for instance, after the receipt of one pulse Pa (or Pb) immediately after switching, only the other pulse Pb (or Pa) maybe counted so that the switching timing is defined as the point of time when that count value has reached 5, whereby the same switching action as the above can be effected.

It is to be appreciated that the switching timing be preferably set to a point of time when the welding current I is in the vicinity of 0 level, in order to prevent any turbulence of waveform in the waveform restoration signal AI at the time of switching, in other words, to ensure a smooth switching (connection) between the two integral value signals AIa and AIb.

In cases where the switching control signal generation circuit 80 within the switching circuit 34 has been formed from the hardware circuit such as the counter circuit or the logic circuit as in the first embodiment described above, it would be possible for the CPU 26 to be dedicated to the other processing for the duration of current supply, which will be advantageous to the resistance welding control unit. More specifically, in the resistance welding control unit, major processing of the CPU 26 during the current supply is to provide a control to supply the welding current I in conformity with the set value. For example, in case of performing a constant current control by use of the feedback system, it is necessary to calculate the current effective value every cycle or every half-cycle, to compare the calculated value (measurement value) with the set value to obtain an error, and to determine the firing angle or the conduction angle for the next cycle on the basis of the error. Accordingly, the CPU is largely occupied by the processing time (throughput) therefor and the software scale.

It is thus possible to reduce the burden on the CPU 26 to a large extent by forming the switching control signal generation circuit 80 within the switching circuit 34 from the dedicated hardware circuit (the counter circuit, logic circuit, etc.) as in the first embodiment.

Though in fact, the CPU 26 may perform the function of the switching control signal generation circuit 80 by way of the software processing as in the second embodiment.

The resistance welding monitoring unit itself does not determine the current supply mode in the resistance welding but necessitates an adaptability as the external monitor, while the built-in CPU is allowed to be dedicated to the monitoring of the welding current supply. For this reason, there lies a great significance or advantage in that the CPU executes the function of the switching control signal generation circuit 80 within the switching circuit 34 as in the above second embodiment.

The invention is not limited to the embodiments described and shown. Various other modifications can be made within the scope of the invention.

In the above embodiments, the current sensor 20 has been mounted on the secondary side of the welding transformer to detect a secondary current (welding current). However, also in case of mounting the current sensor 20 on the primary side of the welding transformer to detect a primary current, the same operations and effects as the above are achieved.

The current detecting apparatus of the present invention is applicable not only to the seam welding machine described hereinbefore but also to a spot welding machine or the like. It is further applicable to machining apparatuses of the other systems such as fusing apparatuses allowing a use of differential detection type current sensor such as the toroidal coil.

What is claimed is:

1. A current detecting apparatus for resistance welding, comprising:

a current sensor for sensing a primary or secondary current flowing in a resistance welding machine and outputting a current sense signal representing a differential waveform of said current;

first and second integrating means which are switchable between a first state and a second state and which in said first state integrate said current sense signal from said current sensor to output an integration value signal representative of a waveform of said current and which in said second state reset said integration value signal to a reference value; and switching means for alternately switching the states of said first and second integrating means at predetermined intervals so that while one is placed in said first state the other is in said second state.

2. A current detecting apparatus for resistance welding according to claim 1, wherein said switching means includes:

timing detection means for detecting a cycle of said current on the basis of a waveform of said current sense signal from said current sensor;

counter means for counting pulse signals derived from said timing detection means in conformity with said current cycle; and switching control means for separately inverting the states of said first and second integrating means at the point of time when a count value derived from said counter means has reached a predetermined value.

* * * * *